United States Patent [19]

Liu

[11] Patent Number: 4,775,955
[45] Date of Patent: Oct. 4, 1988

[54] CACHE COHERENCE MECHANISM BASED ON LOCKING

[75] Inventor: Lishing Liu, Millwood, N.Y.

[73] Assignee: International Business Machines Corporation, Armonk, N.Y.

[21] Appl. No.: 134,676

[22] Filed: Dec. 18, 1987

Related U.S. Application Data

[63] Continuation of Ser. No. 792,728, Oct. 30, 1985, abandoned.

[51] Int. Cl.⁴ ............................................... G06F 9/00
[52] U.S. Cl. .................................................... 364/900
[58] Field of Search ................................ 364/200, 900

[56] References Cited

U.S. PATENT DOCUMENTS

| | | | |
|---|---|---|---|
| 4,322,795 | 3/1982 | Lange et al. | 364/200 |
| 4,394,731 | 7/1983 | Flusche et al. | 364/200 |
| 4,426,681 | 1/1984 | Bacot et al. | 364/200 |
| 4,471,429 | 9/1984 | Porter et al. | 364/200 |
| 4,484,267 | 11/1984 | Fletcher | 364/200 |
| 4,493,026 | 1/1985 | Olnowich | 364/200 |
| 4,513,367 | 4/1985 | Chan et al. | 364/200 |
| 4,620,275 | 10/1986 | Wallach et al. | 364/200 |
| 4,622,631 | 11/1986 | Frank et al. | 364/200 |

Primary Examiner—Gareth D. Shaw
Assistant Examiner—John Gladstone Mills
Attorney, Agent, or Firm—Jack M. Arnold; Terry J. Ilardi

[57] ABSTRACT

A method and apparatus is provided for associating in cache directories the Control Domain Identifications (CDIDs) of software covered by each cache line. Through the use of such provision and/or the addition of Identifications of users actively using lines, cache coherence of certain data is controlled without performing conventional Cross-Interrogates (XIs), if the accesses to such objects are properly synchronized with locking type concurrency controls. Software protocols to caches are provided for the resource kernel to control the flushing of released cache lines. The parameters of these protocols are high level Domain Identifications and Task Identifications.

4 Claims, 6 Drawing Sheets

Cache with Directory in BCE

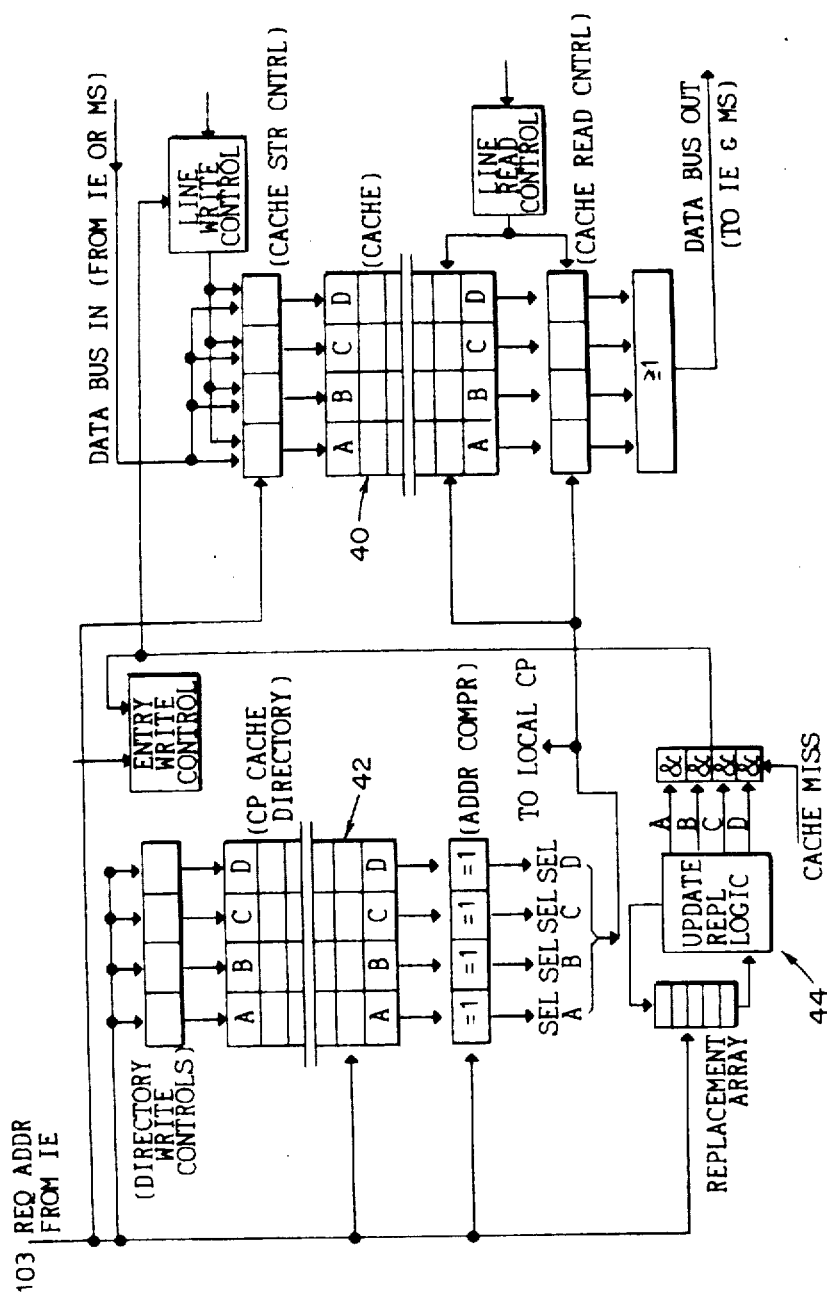
FIG. 2  Cache with Directory in BCE

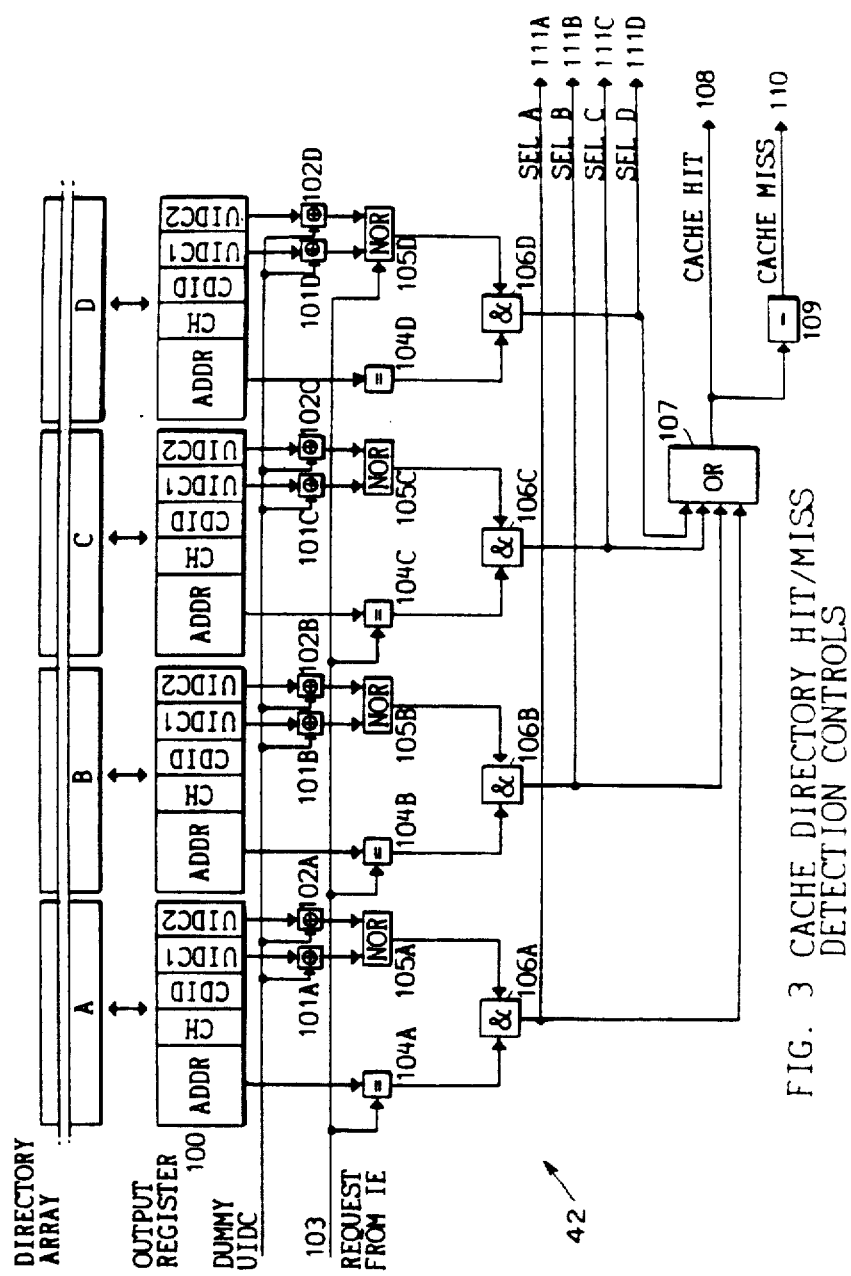
FIG. 3 CACHE DIRECTORY HIT/MISS DETECTION CONTROLS

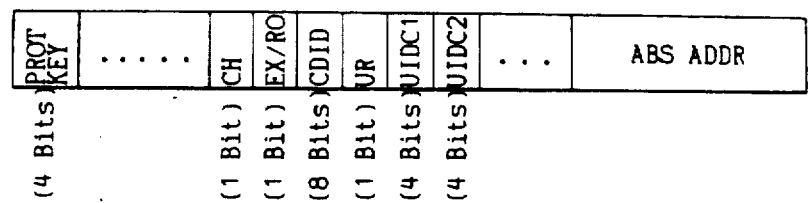
FIG. 4    PD Entry
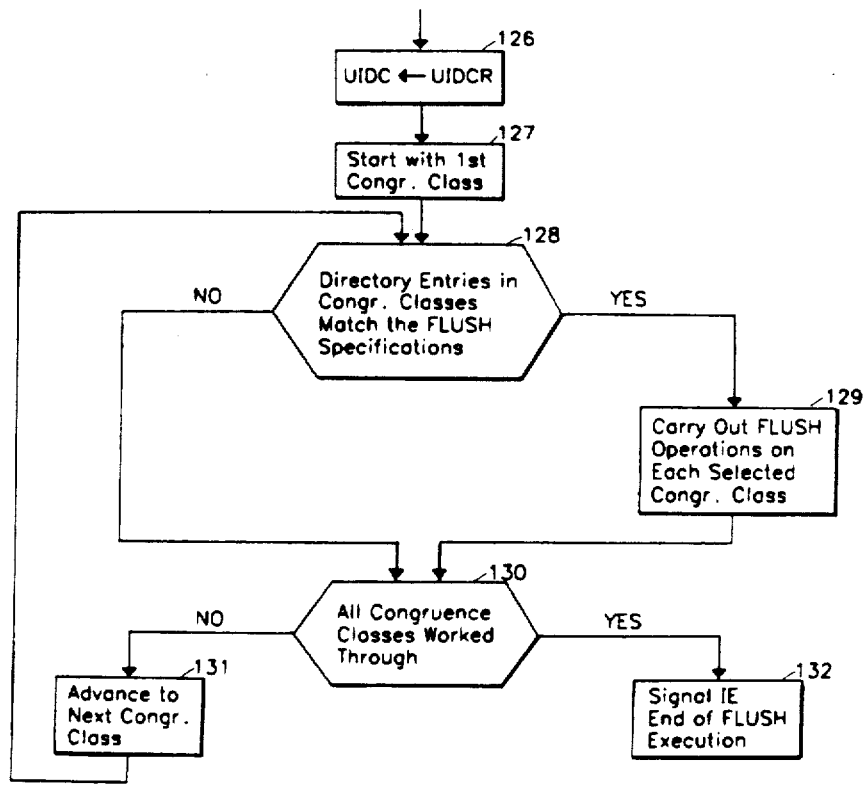
FIG. 6    Flowchart for FLUSH Execution

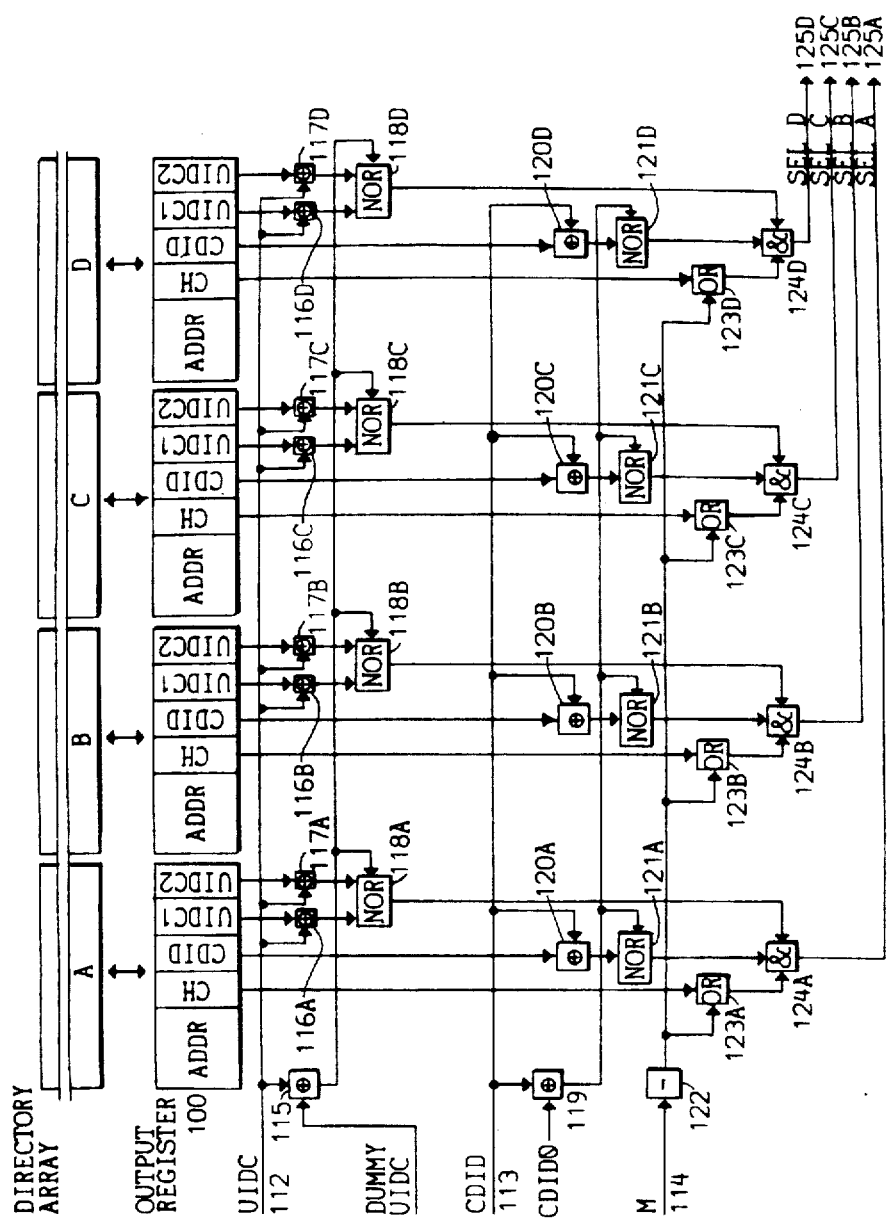
FIG. 5 PD ENTRY SELECT FOR FLUSH

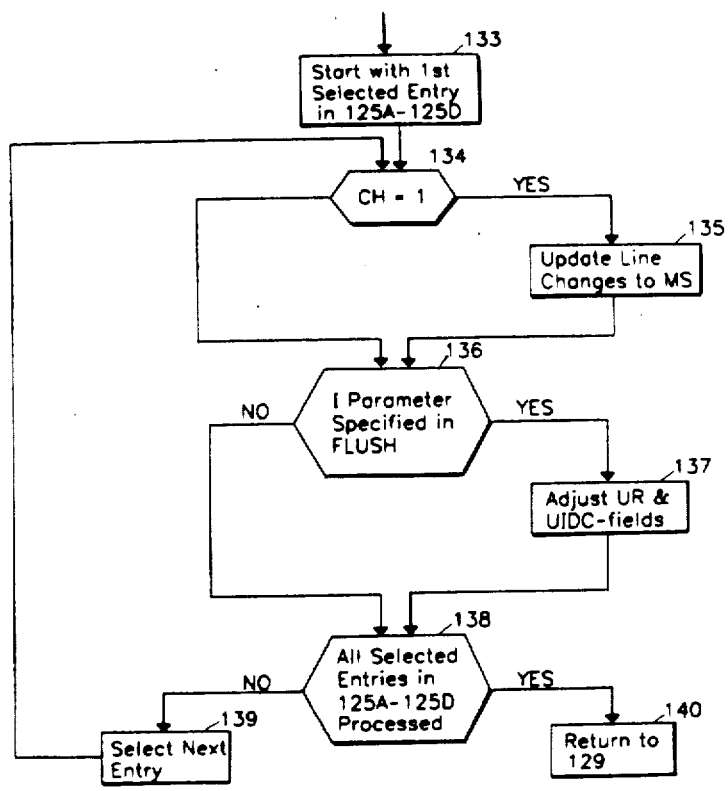
FIG. 7   FLUSH for Entries Selected in 125A-125D

CACHE COHERENCE MECHANISM BASED ON LOCKING

This application is a continuation of application Ser. No. 792,728 filed Oct. 30, 1985 now abandoned.

TECHNICAL FIELD

This invention is in the field of data processing. In particular, it is directed to the control of sharing consistency of data shared among a plurality of central processors with private caches in a multiprocessing system.

PRIOR ART

Most high performance processors (CPs) have private high-speed hardware managed buffers, which are often known as caches. Caches are usually transparent to the users of the system. In a multiprocessor (MP) system there can be many CPs sharing the same main storage (MS), and each CP is always required to obtain the most recently updated version of data when an access is issued. This requirement takes hardware control of data consistency among caches, which is often known as the cache coherence problem.

There are various types of caches in prior art MP systems. One type of cache is the store through (ST) cache which does not interfere with a CP storing data directly to the main storage (or a second level cache) in order to always update changes of data to the down level storage hierarchy. Upon the update of a store to main storage, appropriate cross integrate (XI) actions may take place to invalidate the copies of the cache line involved from the caches other than the one at the CP which initiates the store. Usual ST designs require substantial main storage bandwidths to incorporate the data stores (which normally average between ten to twenty percent of all CP storage requests).

Another type of cache design is the store-in cache (SIC). SICs are described in U.S. Pat. Nos. 3,735,360 to Anderson et al and 3,771,137 to Barner et al. A SIC cache directory is described in detail in U.S. Pat. No. 4,394,731, to Flusche et al in which each line in a SIC has its MP shareability controlled by an exclusive/read-only (EX/RO) flag bit. The main difference between ST and SIC caches is that, all stores in SIC are directed to the cache itself (which may cause a cache miss if the stored line is not in the SIC cache). Usually cache line modifications are updated to MS only when the lines are replaced from the cache. As a result the SIC design reduces the main storage bandwidth requirement, at the expense of more complex coherence control and the penalties of XI-castouts (XI-castout occurs when a data access from one CP finds the line modified in the cache of another CP).

There have been various cache coherence control mechanisms developed. Typical examples are: Global Directory, Broadcasting, and Memory Tagging. In the Global Directory approach, the storage control elements (SCEs) contain copies of the CP cache directories, so that XI decisions may be resolved rather efficiently. The broadcasting approach routes storage requests from CPs to all other CPs if accesses cannot be resolved at local caches. The Memory Tagging approach tags each line in main storage to indicate (or to approximate) which CPs have the line in their caches currently.

All the above mentioned cache coherence control approaches have drawbacks when the number of CPs increases or when there is physical separation between CP clusters, especially when high performance CPs are under consideration.

Another alternative is to have software control the coherence of certain data for which efficient implementation of XI control may be constrained. The idea is to flush lines out of the private cache when there is danger of data pollution through stores from other CPs. Such pollution may occur when, for example, an object is released by a task running on the CP, and hence tasks on other CPs may obtain the resource and modify it. In some computer architectures (e.g., the IBM 801) there are instructions offered to flush data lines out of a cache. Such cache flush instructions are designed by specifying address ranges in which lines are to be replaced from the cache. Such approaches force the software (e.g., the compiler or the programmer) to keep track of the address ranges for flushing. Address range is a non-semantic specification of logical objects in software. Therefore, such cache flushing instructions make storage systems less transparent to software.

There are several techniques known for cache coherence controls, however, there is no art known to applicant which is directed to cache coherence based on locking. The following is representative ar in cache control mechanisms.

U.S. Pat. No. 4,484,267 to Fletcher deals with certain variations of the conventional cache coherence control mechanisms. It is trying to dynamically determine whether a cache line is potentially subject to future cross interrogate and tries to do store through on such lines in order to reduce the penalties of pingponging. In this scheme conventional global SCE directory control is needed to do invalidates. In the subject invention, however, a cache design (plus appropriate system design) is set forth in which the global XI control may be eliminated so that highly-coupled multiprocessors may not need to worry about cross interrogates at all, through proper software control.

U.S. Pat. No. 4,293,910 to Flusche et al deals with the control of protection keys. Protection keys have been used for detecting unauthorized accesses or modifications to memory data. In the subject invention, however, memory tags are used to simplify cache coherence operations. There is no direct relationship between protection keys and the proposed scheme of memory tags.

U.S. Pat. No. 4,400,770 to Chan et al deals with the so called "synonym problem." The synonym problem is caused by the possibility of more than one (e.g., 4) cache congruence classes selected by the "virtual" addresses representing the same physical (absolute) line address. This problem has something to do with the page size, cache size and the cache line size. It is not directed to the cache coherence problem in multiprocessors.

U.S. Pat. No. 4,400,773 to Brown et al deals with the I/O channel serialization problem. It uses the software control blocks UCB's to store certain lock bits and uses the Test Subchannel instruction to test for serialization conditions. The subject invention, however, deals with caches and is not particularly concerned about the serialization problem of channel operations on particular I/O devices.

U.S. Pat. No. 4,399,504 to Obermarck et al deals with database locking in multiple systems. It's focus is on the algorithm aspect for a software package. The subject invention, however, assumes certain software synchronization (e.g., database locking) implementations and does not really concern itself about how the software locking is implemented U.S. Pat. No. 4,099,243 to Palumbo deals with the serialization of operations on a memory block from different devices through a lockout scheme. This is similar to database locking, except that it is dealing with memory blocks and is implemented primarily through hardware. Similar to U.S. Pat. Nos. 4,400,773 and 4,399,504 above, Palumbo is dealing with device serialization and is implementing locking like facilities.

The subject invention assumes certain existing synchronization of objects in system software. An object is a resource (entity) that is more precisely controlled by the system software (e.g., operating systems, file systems, etc.). An object is different depending on the application its's used in. For example, in a file system application, an object could be a file, or an index directory. For a general operating system an object could be a page frame, an integral data structure (e.g., a queue, a table, a lockword), a user process, a class of storage, etc., depending upon how a system controls its resources (e.g. on space allocation, authorization etc.). The concept of objects is further described in "HYDRA: The Kernel of a Multiprocessor Operating System", by Wolf et al, *Communications of the ACM*, Vol. 17, No. 6 June 1974, pp. 337–346. Cache protocols are dealt with which guarantee cache coherence assuming the correctness of the software synchronization. Therefore, Palumbo's invention and the subject invention are dealing with different problems in different ways.

According to the subject invention, a novel arrangement and control is provided to associate in cache directories certain logical identities of software objects and/or user tasks. Therefore, semantic protocols may be used by software to perform cache flushing in order to maintain cache coherence. This eliminates the need of XI control in certain situations in which the efficient implementations are difficult to achieve.

BRIEF DESCRIPTION OF THE DRAWINGS

FIG. 2 is a detailed block diagram of a modified conventional four-way set associative cache. In this diagram the new fields CDID, UIDCI and UIDC2 in each directory entry and some related control circuits are shown;

FIG. 3 shows the CP cache directory hit/miss detection circuits;

FIG. 4 illustrates the tag bits in each CP cache directory entry;

FIG. 5 shows the control circuits for FLUSH execution at each congruence class;

FIG. 6 contains a flowchart for the overall execution steps of FLUSH; and

FIG. 7 contains a flowchart for the execution of FLUSH on a cache congruence class when there are cache line entries in the congruence class found to match the conditions specified by the FLUSH parameters.

DISCLOSURE OF THE INVENTION

Figure 1:
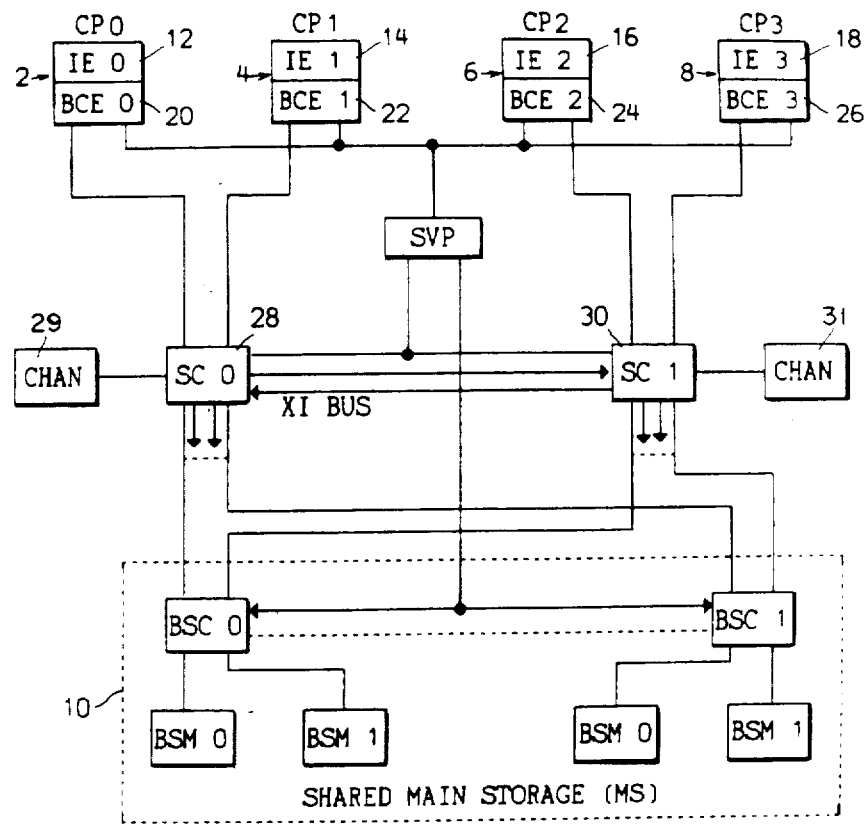
FIG. 1 is a block diagram showing the cache and directory in a multiprocessing configuration.

A method and apparatus for associating in cache directories the Control Domain Identifications (CDIDs) of software covered by each cache line. Through the use of such provision and/or the addition of Identifications of users actively using lines, cache coherence of certain data is controlled without performing conventional Cross-Interrogates (XIs), when accesses to such objects are properly synchronized with locking type concurrency controls. Software protocols to caches are provided for the resource kernel to control the flushing of released cache lines. The parameters of these protocols are high level Domain Identifications and Task Identifications.

BEST MODE FOR CARRYING OUT THE INVENTION

The subject invention provides a novel arrangement and control to associate in cache directories certain logical identities of software objects and/or user tasks. With such provision semantic protocols may be used by software to perform cache flushing in order to maintain cache coherence. This eliminates the need of XI control in certain situations in which efficient implementations are difficult to achieve.

The basic idea of the locking-based cache coherence control is as follows. Software accesses to shared data are often controlled through certain authorization mechanisms. Locking is a typical technique for such software synchronization control. A user needs to be granted a lock in order to access an object. After using the object the user releases the lock. There are different types of locking. Here the concern is primarily with locking such that, when a user modifies an object, the locking of the object should guarantee exclusivity (that is, this user is the only one who can access this object before the object is released by the user). As a result, a user is granted an EXCLUSIVE lock for an object only when all other users have released their locks on this object.

Assume that the MS is partitioned into BLOCKs of size a power of 2 (e.g., 256 bytes). The BLOCK size should be at least as big as the sizes of all cache lines involved. Hence a line cannot be separated into two BLOCKs. Objects with block disjoint property are being considered. An object has block disjoint property if, at any instance of time, the MS blocks allocated to contain this object should not contain any accessible data not belonging to the object. As far as cache coherence is concerned, one has to make sure that a line in a cache is kicked out of the cache when there is any potential for this line to be modified by other CPs and that modifications to a line in cache is always updated to MS before this line can be accessed from other CPs. These conditions may be met when lines belonging to a block are flushed out of the cache (with modified lines updated to the MS) as soon as there is no more active user on the CP still holding lock on the object covering this block. There have been architectures, for example the IBM 801 computer, in which instructions are provided to flush lines out of the cache. However, such instructions for cache line flushing use address ranges to specify the lines to be flushed. This puts a burden on the software to keep track of the address ranges of software objects, which also makes the storage system less transparent to the software.

The novel approach is adopted here of imbedding identifications of objects in cache directories. This provides instructions for cache flushing that take semantic specifications of target objects. Techniques are also provided to reduce cache miss frequencies due to unnecessarily flushing lines that are concurrently shared by many active users on the same CP.

First, the lines in MS are classified into two types. Type I lines are those for which cache coherence is controlled through FLUSH protocols. Type II lines are the rest. The cache coherence of type II lines may be controlled through other means. In the sequel, unless otherwise specified, only type I lines are dealt with. Also, unless otherwise indicated, the subsequent invention is described using SICs in which MODIFIED bits are used in the cache directory. A cache line with a modified bit ON contains modifications not yet updated to MS.

Each MS BLOCK is dynamically associated with a control domain (CD). A CD is a class of objects drawn from the shared objects.

The control domain concept is related to the partitioning of real storage. For example, assume a system has three objects, $O_1$, $O_2$, and $O_3$. Objects $O_1$ covers two contiguous virtual pages (in virtual, as opposed to real memory) labeled VP1 and VP2. Also, assume objects $O_2$ and $O_3$ are covered by virtual pages VP3 and VP4 respectively and objects $O_1$ and $O_2$ belong to control domain A, while object $O_3$ belongs to control domain B.

Virtual pages VP1-VP4 may be mapped into real pages RP1-RP4 at a particular time. The operating system determines which object should be in which control domain. After a real page frame has been allocated to a particular virtual page, the operating system sets the CDID (that is, the control domain identifier) at the rear frame. Thus, in this example the CDID's of RP1-RP3 will reflect the control domain A, while control domain B will be reflected in RP4. The system hardware will then be able to recognize the CDID for an object upon access. For example, when $O_1$ is accessed the storage control hardware will find CDID A from the CDID tags at RP1 and RP2. Each CD has a unique identification (CDID). The maximum number of CD's existing in the MP system is determined by the number of bits available to represent each CDID. Many BLOCKs may belong to the same CD. For each storage access from a CP, the corresponding CDID should be known to the hardware. The CDIDs may be stored in address translation tables (e.g., segment tables, page tables) or may be implemented directly by hardware (e.g., 8 tag bits per 1 megabyte MS storage). Within the directory of each cache (which may be ST or SIC) there is a CDID-field (in addition to other necessary status indicators like a VALID-bit and MODIFIED-bit) for each line in the cache, which will store the CDID for the current line. When necessary, a unique CDID (denoted CDID0) may be assigned to indicate those Type II data lines (for which the shareability is not controlled by the explicit cache line flushing approach). Upon the fetch of a line into a cache from MS the CDID obtained by the storage access hardware is gated into the CDID-field of the cache directory automatically. Assuming the PAGE is the granularity of virtual address translation and that Translation Lookaside Buffers (TLBs) are used for the speedup of translation, the CDID(s) for each PAGE used may also be recorded in their corresponds TLB entries.

The option of associating user identifications (UIDs) to cache directories is also provided. The UID identifies a process, for example, a system user in a network, and application program or even another system that uses shared memory. This option may allow the reduction of the overhead of flushing lines from a cache while there are still users on the CP holding locks on the involved objects. The user considered should be compatible with the locking and accessing of shared objects. There should not be multiple (more than one) locks held on the same shared object under the same UID at any point of time. A program accessing a shared object running under a UID should be granted the right of access through a lock obtained under the same UID. Also, a lock on shared object obtained under a UID should be released under the same UID. The definition of UID is up to the particular system implementation. When this option is exercised the UID should be available to the storage access hardware. A UID may be loaded into a control register via LCTL type instructions by the system before a program is started. In the following, the subject invention is described with the option of associating UIDs at cache directories.

There are a fixed number (e.g., 2) UIDC-fields in each line entry of the cache directory. Each UIDC consists of a fixed number of bits (e.g., 4 bits). A UID may take more bits (e.g., 32 bits) to represent than its corresponding UIDC does. The UIDC is a UID class identifier used instead of the UID in cache directory entries to save circuitry since the UIDC tends to be shorter than the UID. The UIDC for a UID (indicated as "uidc(UID)") is derived by hardware according to certain rules (e.g., extracting certain bits from UID). When there are more than one UIDC fields in each directory entry, as will be assumed for the following description, certain LRU (PLRU) type replacement hardware is provided to capture up to K, where K is an integer, active UIDCs associated with accesses to the cache line. When an access to a cache line (with CDID not equal to CDID0) is issued by the CP, the hardware checks whether the current UIDC is already in the UIDC-field in the cache directory entry. When a match is found this UIDC is made most-recently-used (MRU), if it is not already so. Otherwise the UIDC is inserted as MRU through necessary replacements. A unique UIDC is designated as DUMMY, which cannot be the UIDC of any valid UID. Also, a UID (also called DUMMY) is assumed which cannot be the UID for any running program. When both UIDC values are DUMMYs in the UIDC-fields of a cache line entry, the cache line is treated as INVALID. (In this case, therefore, a separate V-bit is not needed in a cache directory entry to indicate the validity.) During system reset all UIDC-fields in cache directories are initialized to contain DUMMYs.

The cache coherence control is implemented through an instruction FLUSH of the form

FLUSH UID,CDID,M,I

The flags modified (M) and invalidate (I) may be represented using one bit each. The exact format of the instruction is up to the particular architecture design. When FLUSH is issued from a CP, the parameters UID, CDID, and M, are used to match the target lines of operation in the cache. The meanings of UID and CDID are obvious from previous descriptions. When M flag is on, the FLUSH operates only on modified lines in the cache, otherwise it also covers unmodified lines. When the UID parameter specified is not DUMMY, the FLUSH covers only those lines with "uidc(UID)" found in the UIDC-fields in the cache directory, otherwise no matching of UIDC is carried out. For all the cache lines matched by the UID, CDID, and M specifications, the execution of FLUSH will update the modified ones to MS and turn off the corresponding MODIFIED bits. Consider an implementation of FLUSH in which the UID is specified using a general purpose register (GPR), and it is assumed that GPR 0 (R0) indicates the DUMMY UID. If the I flag is on and if UID is not specified by R0, the execution of FLUSH will also change the "uidc(UID)s" in the matched directory entries to DUMMY. If the I flag is on and if the UID is specified as R0, the cache lines matched will actually be invalidated (by putting K DUMMYs in the UIDC-fields of their directory entries).

The execution of FLUSH should be synchronous with MS updates. When modified cache lines are updated to MS due to the execution of flush, the FLUSH is not done till these updates are acknowledged by the MS system.

The acknowledgement of updates by MS is highly dependent on the particular MS architecture. For MS systems in which pending store buffers are implemented, the acknowledgement of updates may be issued as soon as the updates are buffered. This part of the implementation is not discussed further in the following description.

The FLUSH instruction is not limited to the form above presented. For cache organization without MODIFIED bits (e.g., in ST) there is no need for the presence of the M parameter in FLUSH. When it is always desired to do the operations indicated by the I flag, the I parameter may be omitted from the instruction format. When the UID is always known to hardware when FLUSH is executed, the UID parameter may also be omitted. When there is only one CDID other than CDID0, the CDID parameter may also be omitted. It is also advantageous to provide an additional parameter bit S to indicate all shared objects. When the S bit is on, all shared (Type I) objects will be covered in the FLUSH (in which case CDID parameter value may be ignored).

The present invention is primarily intended to provide a design with which the system kernel may issue logical FLUSH protocols to guarantee cache coherence for certain shared data objects which are accessed under appropriate locking control. Before a user starts accessing a shared object a locking protocol is issued to obtain authorization of access. After such accesses to the shared object are complete the user's request for releasing the lock, the system kernel uses the FLUSH instruction to perform necessary cache flushing operations before the lock is actually released for the availability to other users. Also, when there is possibility of CP switch for a user, the system may issue FLUSH instruction to clean up the working lines in the cache of the CP that the user last ran on. The FLUSH instruction should only be executed in a privileged system state. In this way, the consistency of memory state cannot be ruined by problem programs, and the problem programs are relieved from the burden of maintaining cache coherence.

Adversary performance degradations may result if the FLUSH instruction is executed at high frequence. A good system design utilizing the present invention should limit the software based cache coherence control only to relatively infrequently access shared objects for which an efficient XI implementation cannot be easily achieved. This situation occurs when there are a large number of CPs in the MP system or when there is physical separation between CP groups. When such a situation occurs, it can be rather difficult to obtain a fully general cache coherence control using a conventional technique. A reasonable approach to provide MS sharing in such an environment is to partition the system such that most of the system activities are carried out in individual CPs (or CP groups), and let the CPs (or CP groups) communicate with each other through simple accesses to shared objects. A potential example of such shared object is messages. The present invention then provides an elegant approach to the control of data consistency for the access of objects shared among CPs (or CP groups).

The allocation of shared objects to CDs has an impact on cache performance. Consider the situation when a user is authorized to access two different shared objects. When one of the objects is released by the user the system may flush out valid working lines for the other object in the cache if these two objects happen to be allocated in the same CD. This would cause unnecessary storage overhead on memory updates and cache misses. Therefore, the primary principle in allocation of shared objects to CDs is to provide reasonable randomization of CDIDs among active shared objects so that the above phenomenon tends not to occur frequently.

In FIG. 1 a potential MP configuration is described in which the subject invention may be implemented. There are N, where N is an integer, CPs 2, 4, 6 and 8 in the MP sharing the same MS 10. Each CP has an instruction decoding and execution element (IE) 12, 14, 16 and 18, respectively, and a buffer control element (BCE) 20, 22, 24 and 26, respectively. The BCE contains a private CP directory, and its respective cache and controls. Each BCE accesses the shared main storage (MS) 10 through a storage controller (SC) 28 or 30. The SCs 28 and 30 are connected to channel devices 29 and 31, respectively. The MS 10 may instead be a second level (L2) cache which is shared by all CPs wherein the L2 cache in turn accesses MS; and the operation of such L2 cache will be the same as the MS operation described below.

FIG. 2 shows the internals of one of the BCE's 20, 22, 24 or 26 shown in FIG. 1. The BCE includes a four-way associative cache 40, its directory 42, directory replacement selection circuits 44 and other logic associated with each CP of the type previously described in U.S. Pat. No. 4,394,731 except for the CDID, UIDC1, UIDC2 fields and their control circuits. The entire BCE specification of U.S. Pat. No. 4,394,731 is incorporated herein by reference. The processor directory in U.S. Pat. No. 4,394,731 is modified to provide a CP cache directory for the subject invention by replacing the prior V bit position with UIDC1, UIDC2 and by adding two new fields UR (1 bit) and CDID in each line entry in the directory as shown in FIG. 4. Also, the controls for the CP directories described herein for the embodiment of this invention are different from those in U.S. Pat. No. 4,394,731.

The UR bit in each cache directory entry serves the purpose of implementing LRU on the UIDC1 and UIDC2 for the line. At a cache directory entry UIDC1 (UIDC2, respectively) is least-recently-used (LRU) if the UR is 1 (0, respectively). When a new (distinct) UIDC is to be inserted into a directory entry, the UIDC-field in the entry to contain the new UIDC is the one which is LRU. For illustration purpose, it is assumed that the BLOCK granularity is PAGE, and that each page table entry contains the CDID associated with the current PAGE. Upon virtual address translation the translation facility obtains the CDID of the involved PAGE and gates it into an internal register CDIDR at the BCE. It is also assumed that, when a program is dispatched for execution on a CP, its "uidc(-UID)" is loaded into an internal register UIDCR, which is also located at the BCE. In the description, "content(CDIDR)" "(content(UIDR)", respectively) is used to indicate the current content in register CDIDR (UIDR, respectively).

FIG. 3 shows the entry format of pertinent information in the four associative entries in any selected congruence class in an output register 100 or the CP cache directory. Conventional XOR circuits 104A-104D determine which (if any) of the four associative entries is selectable, and UIDC compares (=DUMMY) 101A-101D, 102A-102D followed with NOR gates 105A-105D allow only the selection 106A-106D of a valid line entry to determine if there is a cache hit or miss by a request address from the IE 103. A cache hit in the congruence class in register 100 then activates one of the input lines to an OR circuit 107 to enable a cache hit line 108. If none of the input lines to OR circuit 107 is activated, a cache miss line 110 is enabled by an inverter 109 receiving no signal from OR circuit 107.

Upon a cache miss, BCE uses the internal register CDIDR (which is set by the translation facility) to check whether the CDID for current cache request is CDID0. If it is found that the current cache request is for CDID0, the actions taken (e.g., on XI decisions and on replacement array updates) are similar to what is described in U.S. Pat. No. 4,394,731, except that invalidation of a (remote) cache line is represented by putting DUMMY into both UIDC1 and UIDC2 of the invalidated remote cache directory entry. When a cache hit is detected not for CDID0, the selected cache line is regarded ready for access by IE (without any further XI considerations). In both cases, the UIDC-fields of the selected directory entry are updated according to the rules specified in Table I before the cache access finishes.

TABLE I

| | CONDITION | ACTIONS |
|---|---|---|
| 1. | UIDC1 = UIDC | UR ← 0 |
| 2. | UIDC2 = UIDC | UR ← 1 |
| 3. | (UIDC1 ≠ UIDC) & (UIDC2 ≠ UIDC) & (UR = 0) | UIDC2 ← UIDC UR ← 1 |
| 4. | (UIDC1 ≠ UIDC) & (UIDC2 ≠ UIDC) & (UR = 1) | UIDC1 ← UIDC UR ← 0 |

The CH bit of the selected directory entry will be turned on if the IE requested a store operation. Also, for a cache miss, "content(CDIDR)" is gated into the CDID-field of the directory entry for the newly fetched line. Upon a cache miss for a cache access request from IE 103 with "content(CDIRD)" ≠CDID0, decisions are made to replace the LRU line in the selected congruence class. The selection of LRU line for replacement is similar to the methods adopted in U.S. Pat. No. 4,394,731. Updates to MS is carried out first if the replaced line has CH bit on in its directory entry as specified in U.S. Pat. No. 4,394,731. The newly fetched line from MS for the requested from IE is transferred to the cache line position at which the replacement was selected. The directory entry of the newly fetched line is reset such that CDID← "content(CDIDR)", UIDC-1←"content(UIDCR)", UIDC2 ←DUMMY, and UR←0. The change bit CH should also be set as 1 if the IE request was for a store operation.

A potential implementation for execution of FLUSH instruction issued from IE is described in the flowchart in FIG. 6. The algorithm described in FIG. 6 is as follows. The congruence classes of the cache are searched one after another looking for directory entries (if any) that match the specifications indicated by the parameters of the FLUSH. When matched directory entries are found in a congruence class, appropriate actions are taken for the execution of FLUSH.

The logic diagram for the directory entry matching part 128 in FIG. 6 is described in FIG. 5. The UIDC 112 (computed from input parameter UID of FLUSH) is compared with the UIDC-fields of the four associativities using XOR gates 116A-116D and 117A-117D. Then the OR gates 118A-118D determine whether each of the four entries in the congruence class has matched UIDC fields. The XOR circuit 115 determines whether the input UIDC is DUMMY, and delivers the output bit (0 if the input is DUMMY) to the NOR gates 118A-118D. Similarly, the CDID input parameter is matched against the CDID fields of the four entries in the congruence classes using XOR gates 120A-120D. The XOR gate 119 is used to determine whether the input CDID is CDID0, and the output bit (0 if input is CDID) is gated to NOR gates 121A-121D. The M Parameter bit of FLUSH is first inverted at the inverter 122, and then are input to the OR gates 123A-123D. The AND gates 124A-124D then select all the entries in the congruence class that have matched values against input parameters UIDC, CDID and M.

For any given congruence class, if there are entries selected from 125A-125D in 128, each of the selected lines is subject to FLUSH operation 129. FIG. 7 provides a flowchart for 129. In FIG. 7 each of the line entries selected 125A-125D are checked against their change flag CH first 134. When CH=1 the line (or its changes) will be updated 135 to MS, and the CH bit is turned off upon receiving MS acknowledgement of update. Afterwards, if the I flag is specified in the FLUSH 136, appropriate invalidate step is taken 137 on the selected entry. The invalidate step 137 is carried out by properly changing UR, UIDC1 and UIDC2 fields according to the rules in Table II.

TABLE II

| | CONDITION | ACTIONS |
|---|---|---|
| 1. | UIDC = DUMMY | UIDC1 ← DUMMY UIDC2 ← DUMMY |
| 2. | (UIDC ≠ DUMMY) & (UIDC1 = UIDC) | UIDC1 ← DUMMY UR ← 1 |
| 3. | (UIDC ≠ DUMMY) & (UIDC2 = UIDC) | UIDC2 ← DUMMY UR ← 0 |

The above descriptions of the subject invention do not deal with specifics on the design of storage control below BCE level, since the invented cache primitives (UID, UIDC, CDID, CDIDC, UR) and FLUSH instruction may be implemented with a variety of known storage hierarchy design below the BCE level. Though the lower level storage design may be tailored to provide better implementation of the subject invention. The definitions of UIDs and CDIDs for user and data are up to the particular system design. Special instructions like

SETUID UID

SETCDID CDID,PAGEID or other variants may be supplied for software definitions. If desired, the internal register UIDCR may be replaced by or enhanced with another register UIDR that contains UID (instead of "uidc(UID)").

The present invention has been described using SICs. Extension of the descriptions to MP with ST caches is straightforward. With ST caches all operations associated with CH flags and MS updates upon cache line replacements and invalidates may be discarded.

In FIG. 6 the presented execution of FLUSH is sequential on a congruence class basis. For each congruence class, the PD entry select circuits of FIG. 5 execute the FLUSH specification matching of the four entries of the congruence class in parallel. Better implementation of FLUSH execution should optimize the parallelism in matching cache directory entries against FLUSH parameters. In a cache directory entry the tags needed for the matching of FLUSH conditions are primarily CH, CDID, UIDC1 and UIDC2. Potential approach in optimizing this part of the design is to move some or all of these tags to separate circuits (or to maintain an extra copy of these tags) so that the search for matched directory entries is not limited to the readout of individual congruence classes. Specially designed circuits may perform in parallel the matching operations in FIG. 5 for more (e.g., 16) directory entries in parallel at a tme.

The CDID tags at cache directory entries are maintained primarily for FLUSH operations. In an MP it is always safe (though not optimal for performance) to FLUSH extra cache lines. One practical way of saving directory bits is to use a CDID class (CDIDC) tag, instead of the CDID tag, at each cache line entry. Consider 8-bit representation for CDID and 4-bit representation for CDIDC. More than one CDIDs may be associated with the same CDIDC. For a CDID, the corresponding CDIDC (denoted "cdidc(CDID)") may be computed by extracting (or XORing) certain bits from the CDID representation. When CDIDC tags are used in cache directories, the input line 113 (FIG. 5) of the FLUSH entry select circuits should be sending "cdidc(CDID)" (instead of CDID) which may be precomputed and stored in an internal register. A crucial factor in the design of CDIDC computation and allocation of shared objects to CDs is to provide enough randomization so that the execution of a FLUSH instruction does not affect much the lines in cache that are not part of the shared objects causing the FLUSH.

The present invention has been described with the option of implementing UIDs and UIDCs. When this option is not required, an explicit V-bit per cache directory entry may be needed (as described in U.S. Pat. No. 4,394,731) to indicate the validity of the cache line. Other parts of the described implementation may be modified simply by eliminating all circuits and steps related to the testing and update of UIDs and UIDCs.

The present invention has been particularly shown and described based on the SIC cache organization framework of U.S. Pat. No. 4,394,731. It will be understood by those skilled in the art that the foregoing and other changes in form and details may be made therein without departing from the spirit and scope of the invention.

INDUSTRIAL APPLICABILITY

It is an object of the invention to provide an improved cache coherence mechanism.

It is another object of the invention to provide an improved cache coherence mechanism based on locking.

It is yet another object of the invention to provide an improved cache coherence, mechanism by utilizing Control Domain Identification (CDIDs) of software covered by each cache line.

It is still another object of the invention to provide an improved cache coherence mechanism without performing conventional Cross-Interrogates (XIs).

It is a further object of the invention to provide an improved cache coherence mechanism utilizing software protocols to control the flushing of released cache lines, utilizing high level Domain Identifications and Task Identifications.

What I claim as new and desire to secure by Letter Patent is:

1. A method of cache control in a multiprocessing system comprised of a plurality of processors which share a main storage, with each processor having a cache and a directory, each of said directories having a plurality of line entries of information, with a block of information being comprised of at least one line, with a control domain (CD) being defined as at least one of said blocks of information, with each line entry including a CD identification (CDID) flage to identify the CD to which a line belongs, and further including a change (CH) flag which is one state is indicative of said line having been changed since the last update to main storage and when in another state is indicative of not having been changed since the last update to main storage, said method comprising the steps of:

setting said CDID flag, of any line of information transferred from said main storage to said cache, to a selected state which identifies the CD to which said any line is associated with;

issuing a CDID flag, of any line of information transferred from said main storage to said cache, to a selected state which identifies the CD to which said any line is associated with;

issuing a FLUSH command, said FLUSH command including a predetermined CDID flag, by a given processor to remove a line of information with said predetermined CDID from the cache associated with said given processor, said flush command including a modify (M) flag which indicates in one state that said FLUSH command operates only on changed lines in said cache, and in another state operates on changed and unchanged lines;

comparing the CD identification flag in the FLUSH command with the CD identification flag of the lines of information in the associated cache, and if a match of CDID's is found, removing the line with the matched CDID from said associated cache; and removing said line of information from said cache only when said M flag is in said one state concurrent with said CH flag being in said one state.

2. The method of claim 1, wherein a user identification (UID) flage is assigned to each system user of lines of information stored in said main storage to idenfify if more than one user is utilizing a same line of information, said method including the step of:

responding to said FLUSH command by a cache only if ally UID's indicate that no use is being made of said line of information.

3. A method of cache control for maintaining cache coherence in a multiprocessing system comprised of a plurality of central processors (CPs), in which CPs share a main storage (MS), with each CP having a cache and a CP directory, said CP directory having a plurality of line entries of information, with a block of information being comprised of at least one line, with a control domain (CD) being defined as at least one block, with each line entry in said CP directory including a CD identification (CDID) flag, the state of which identifies the CD of the block to which a line belongs, a change flag (CH) the state of which is indicative of whether information content of the line has been changed since a last update to said main storage, a plurality of user identification (UIDC) flags indicative of whether or not the line of information is being used, said method comprising the steps of:

setting the CDID flags of each line of information of any block of information transferred from said MS to said cache to identify the CD of said any block of information;

issuing a FLUSH command, said FLUSH command removing a line of information from a cache and including a CDID flag that is indicative of the CD of lines of information to be removed from said cache, a modify (M) flag which if present indicates said command is to operate only on changed lines in a cache, and a user FLUSH comand identification (UID) flag which if present indicates said command is to operate only if there is no user of said line of information;

comparing the CDID flag of the FLUSH command with the CDIDs of the lines of information in the associated cache;

determining if said M flag of said FLUSH command is present concurrent with said CH flag of the line of information indicating said line of information has been modified;

determining if said UID flag of said FLUSH command is present concurrent with said plurality of UIDC flags of the lines of information indicating there are no users of the line of information; and removing a line of information from said cache in response to a match of the CDID flag of said FLUSH command and the CDID of said line of information, and said M flag of said FLUSH command being present concurrent with the CH flag of said line indicating said line of information has been modified, and said UID flag of said FLUSH command being present concurrent with said UIDC flag of said line of information indicating there are no users of the line of information.

4. The method of claim 3, including the step of indicating a given UIDC flag in a line of information is made invalid if said UIDC flag is in a line of information in which the CDID and CH flag match with the CDID and M Flag, respectively, of the FLUSH command.

* * * * *